United States Patent
Hongu et al.

(10) Patent No.: US 6,917,512 B2
(45) Date of Patent: Jul. 12, 2005

(54) OIL-IMPREGNATED FILM CAPACITOR AND PREPARATION METHOD THEREOF

(75) Inventors: Tatsuhiko Hongu, Tokyo (JP); Kenichi Uesaka, Takefu (JP)

(73) Assignee: Shin-Etsu Film Co., Ltd., Fukui-Ken (JP)

( * ) Notice: Subject to any disclaimer, the term of this patent is extended or adjusted under 35 U.S.C. 154(b) by 0 days.

(21) Appl. No.: 10/843,367

(22) Filed: May 12, 2004

(65) Prior Publication Data

US 2004/0240147 A1 Dec. 2, 2004

(30) Foreign Application Priority Data

May 27, 2003 (JP) ........................................ 2003-149386

(51) Int. Cl.[7] .................................................. H01G 4/22
(52) U.S. Cl. ...................... 361/319; 361/314; 361/315; 361/318; 361/323; 361/324; 361/433; 252/570; 252/572
(58) Field of Search ................................ 361/319, 314, 361/315, 318, 323, 324, 311, 313, 327, 321.3, 433; 252/567, 570, 571

(56) References Cited

U.S. PATENT DOCUMENTS

| | | | | |
|---|---|---|---|---|
| 4,535,382 A | * | 8/1985 | Wada et al. | 361/319 |
| 4,591,948 A | * | 5/1986 | Sato et al. | 361/315 |
| 4,594,642 A | * | 6/1986 | Ito et al. | 361/315 |
| 5,719,742 A | * | 2/1998 | Sugisawa | 361/323 |
| 6,094,337 A | * | 7/2000 | Ueda et al. | 361/311 |

* cited by examiner

Primary Examiner—Dean A. Reichard
Assistant Examiner—Nguyen T. Ha
(74) Attorney, Agent, or Firm—Dennison, Schultz, Dougherty & MacDonald (57) ABSTRACT

Different from conventional so-called mix-type film capacitors involving several disadvantages, in which the dielectric layers consist of a combination of a dielectric plastic resin film and an insulating paper sheet, the invention provides an all-film oil-impregnated capacitor in which the dielectric layers consist only of a plastic resin film such as a biaxially oriented polypropylene resin film (OPP film) suitable for use in microwave ovens. The all-film capacitor of the invention can be obtained and has satisfactory properties only when prepared by using specified materials including the OPP film, aluminum foil and capacitor oil and under specified conditions relative to the dielectric tangent values and dielectric capacity values before and after impregnation with a capacitor oil as well as the conditions in the step of oil impregnation.

10 Claims, 3 Drawing Sheets

OIL-IMPREGNATED FILM CAPACITOR AND PREPARATION METHOD THEREOF

BACKGROUND OF THE INVENTION

The present invention relates to an oil-impregnated film capacitor or, more particularly, to an oil-impregnated film capacitor of which the dielectric layer consists totally of a film of polypropylene resin, suitable as a circuit element in microwave ovens.

A film capacitor is a device as an important circuit element and has an enrolled structure of a metal (e.g., aluminum) foil to serve as an electrode and a dielectric plastic resin film laid one on the other. Film capacitors are usually impregnated with a capacitor oil to fill the spaces between the aluminum foil and the dielectric film in the enrolled body. In the early stage of development of capacitors of this type, the dielectric layer was provided by a so-called capacitor paper sheet, referred to simply as a paper sheet hereinafter. Since a paper sheet per se is a porous material, it is easy to fully impregnate such an enroller body with a capacitor oil, referred to simply as an oil hereinafter, in addition to the advantages to become little swollen with the oil and to exhibit relatively small thermal expansion and shrinkage by the temperature variations due to use of the capacitor so as to afford good versatility in designing of the capacitors.

On the other hand, paper sheets as a dielectric material in the enrolled body of capacitors have several problems. For example, paper sheets in general have a relatively large dielectric tangent value necessarily leading to large internal heat evolution of the capacitor when on use. In addition, paper sheets generally have a relatively low dielectric breakdown voltage which is inhibitive against increase of the potential gradient between the electrodes necessitating an increase in the thickness of the paper sheet and bulkiness of the capacitor in contrast to the requirement for compactness of various electric and electronic instruments.

Furthermore, a paper sheet as a dielectric material in capacitors is not an advantageous material in respect of resource preservation for paper making and prevention of environmental pollution due to occurrence of a large amount of waste materials including paper debris. These problems give rise to a motivation toward switching of the dielectric sheet material from paper sheets to plastic resin films for cost reduction of capacitor production.

Plastic resin films in general have a relatively high dielectric breakdown voltage enabling a capacitor design with a large potential gradient along with small internal heat evolution and a small capacitor volume per unit dielectric capacity to accomplish compactness of capacitors of a large capacity necessitating a decreased installation area. These advantages are greatly contributing to cost saving in the manufacturing of capacitors as well as in the production cost of instruments using capacitors.

By utilizing the above described advantages of film capacitors, so-called all-film capacitors, in which no dielectric paper sheets are used, are known for power capacitors. Currently, biaxially stretched polypropylene films, referred to simply as OPP films hereinafter, are mainly used as the dielectric sheet material of power capacitors operated at a voltage of 600 V or higher by virtue of their excellent electric properties. A power capacitor of this type usually has a structure as a belt-bundled assembly of several to several tens of unit capacitor elements each in the form of a flattened rolled body prepared by enrolling a dual layer consisting of an OPP film and an aluminum foil. Such a belt-bundled assembly of unit capacitors is impregnated with an oil in a metal casing before hermetic sealing so that the electrostatic capacity of the power capacitor is increased from the value $C_1$ before oil impregnation to a value $C_2$ after oil impregnation. The ratio of this capacity increase $C_2/C_1$ is usually in the range from 1.19 to 1.20 in power capacitors, though dependent on various factors.

Different from paper sheets, plastic resin films in general are not porous without micropores and interstices in the internal structure so that, if the plastic resin film is very tightly enrolled to prepare the rolled body, an unduly long time is taken for complete impregnation with the oil. Moreover, plastic resin films generally exhibit larger swelling with the oil than paper sheets along with larger thermal expansion and shrinkage than paper sheets resulting in decreased dimensional stability of the film capacitor.

Due to the above-described characteristics of plastic resin films, various problems and troubles are encountered in the use of an all-film capacitor as a circuit element in microwave ovens. For example, it is a difficult matter to ensure stability of the $C_2/C_1$ ratio for the above-mentioned reasons. The large thermal expansion or shrinkage of the resin films as well as swelling of the film with the oil cause deformation or bulging of the casing eventually leading to leakage of the oil. It is sometimes the case that the capacitor casing of an all-film capacitor is bursted. Thus, it is the present status that no success has yet been reached in the development works for an all-film capacitor usable in microwave ovens with good stability of performance.

As an alternative type of the capacitors for microwave ovens, so-called mix-type capacitors are known, in which the technological advantages of paper sheets and plastic resin films for the dielectric layers are utilized in combination, and capacitors of this type are currently under almost exclusive use for microwave ovens.

Figure 5:
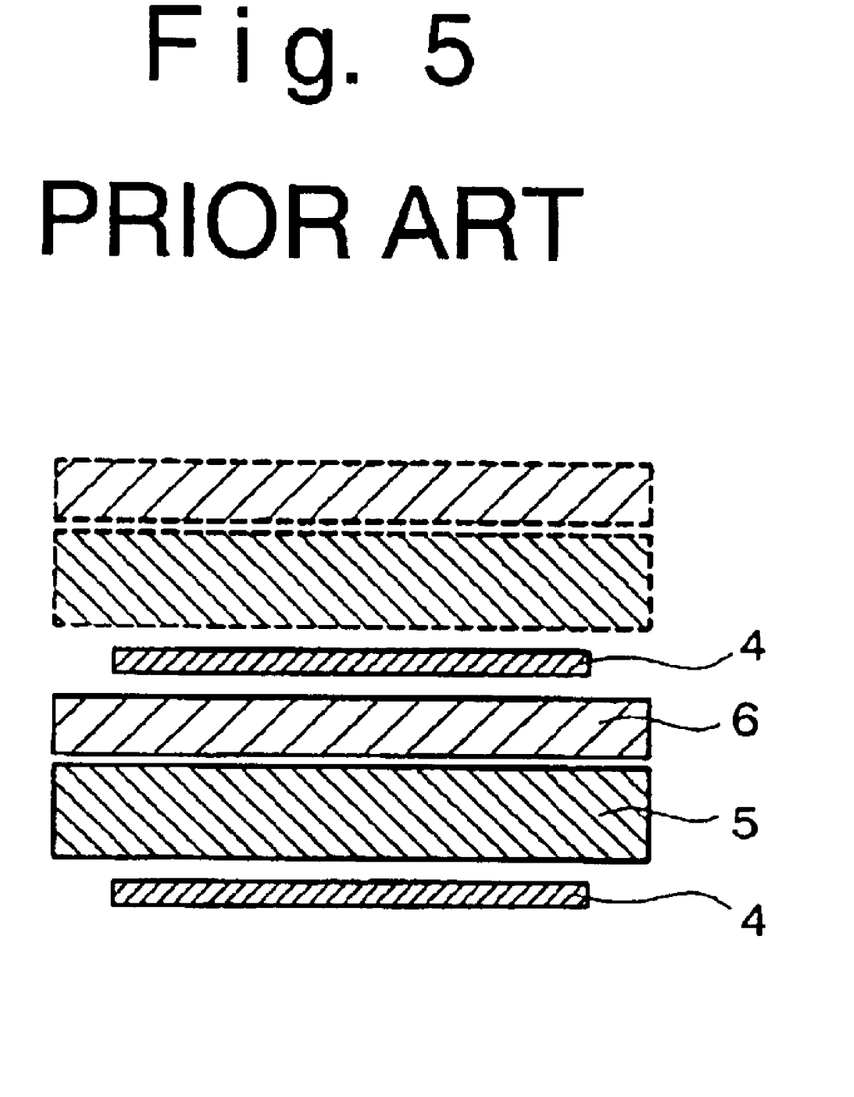
FIG. 5 is a schematic cross sectional view of the layered structure of a conventional mix-type capacitor.

FIG. 5 of the accompanying drawing is a schematic illustration of the layered structure of a conventional mix-type capacitor used in microwave ovens, which is a rolled body prepared by enrolling a ternary layer consisting of an aluminum foil 4, an OPP film 5 and a paper sheet 6 stacked in this order. The dielectric layer between upper and lower aluminum foils 4,4 is constituted of an OPP film 5 and a single paper sheet or two paper sheets 6. Regardless of the surface condition of the OPP film in the unit capacitor of this mix-type, impregnation with an oil can readily be completed because of the porous nature of the paper sheet or sheets 6. Since almost no changes occur in the form of the paper sheet 6 even by impregnation with an oil, the paper sheet 6 may serve as a cushioning or buffering material against oil-swelling and thermal expansion or shrinkage of the OPP film 5 so as to mitigate the pressure on the rolled body and to avoid undue tightening and deformation of the rolled structure contributing to the stability of the capacitor even without strictly defining the $C_2/C_1$ ratio, which is usually in the range from 1.17 to 1.18 when a single paper sheet 6 is used or about 1.20 when two paper sheets 6 are used.

SUMMARY OF THE INVENTION

The present invention accordingly has an object to provide a novel all-film capacitor suitable for use in microwave ovens with fully satisfactory and stable properties as well as to provide a method for the preparation of such a novel all-film capacitor at low costs which has never been accomplished in the prior art.

The all-film type film capacitor for microwave ovens provided by the present invention has a rolled structure formed by enrolling a dielectric sheet and an aluminum foil one on the other which is characterized in that the dielectric layer is essentially constituted of a biaxially oriented polypropylene film (OPP film) alone without any other dielectric sheet materials.

The aforementioned rolled body as a capacitor for microwave ovens is a constrained and flattened roll body consisting of an aluminum foil and an OPP film, which latter preferably has a thickness of 7 to 30 μm, hazy value of 5 to 50% and space factor of 5 to 12% and exhibits a thickness increase not exceeding 13% by swelling when immersed in a capacitor oil at 85° C. for 40 hours or longer. The aluminum foil, on the other hand, should preferably have a thickness of 4 to 7 μm. The capacitor oil, with which the rolled body is impregnated, should preferably have a dielectric tangent value after impregnation (tan $\delta_2$) not exceeding 0.20% at 80° C. for a frequency of 60 Hz. When these requirements for the parameters are all satisfied, the $C_2/C_1$ ratio of the inventive film capacitor can be in the range from 1.08 to 1.22, in which $C_1$ and $C_2$ are the electrostatic capacities of the capacitor before and after, respectively, impregnation with the capacitor oil.

The rolled body prepared by enrolling the layers can be brought into a constrained condition by carrying out either one of or a combination of the following ways (1) to (4).

(1) When the enrolling procedure has come to completion after rolling up a specified length of the aluminum foil, the extraneous rear end portion of the aluminum foil is removed by cutting and the rolled body is over-enrolled with the remaining end portion of the OPP film only;

(2) The rolled body is enveloped with a plastic resin film, which is not limitative to a polypropylene film, having a relatively large thickness;

(3) The rolled body is tightly sandwiched with two rigid plates of a glass phenolic resin, glass urea resin or the like; and (4) The enrolled body is encased in a metal casing which is prevented from bulging by a suitable constraining means.

DETAILED DESCRIPTION OF THE PREFERRED EMBODIMENTS

In the following, the present invention is described in more detail. The polypropylene resin of the OPP film used in the inventive all-film capacitor for microwave ovens should satisfy the requirements for various parameters including the melt-flow index of 1 to 10 g per 10 minutes or preferably, 2 to 6 g per 10 minutes, isotacticity of at least 93% or, preferably, at least 95%, chlorine content not exceeding 10 ppm by weight and ash content not exceeding 30 ppm by weight. It is preferable that the resin is compounded with 500 to 1500 ppm by weight of an antioxidant. The resin or resin composition is shaped at an elevated temperature into a film which is subjected to biaxial stretching to give the OPP film used in the inventive all-film capacitor for microwave ovens as a dielectric sheet material.

When the polypropylene resin composition has a melt-flow index lower than 1 g/10 minutes, difficulties are encountered in shaping of the resin composition into a film and in obtaining an OPP film having desirable properties. When the melt-flow index is too high, on the other hand, it is sometimes the case that the polypropylene resin contains a significant amount of low molecular-weight fractions which would eventually be dissolved out into the capacitor oil or insulation oil.

It is known that the dielectric breakdown behavior of an OPP film largely depends on the crystallinity of the resin. The crystallinity of a polypropylene resin, in turn, is influenced by the isotacticity of the resin, though the crystallinity depends also on the film-forming conditions such as the temperature of film forming and ratio of stretching. While an OPP film of a polypropylene resin having isotacticity of 93% or higher has a degree of crystallinity of about 65 to 85%, an OPP film of a polypropylene resin having isotacticity lower than 93% is subject to increased swelling with the oil due to an increase in the fraction of the non-crystalline portion in the OPP film.

The chlorine content and the ash content of the resin are each a factor having bearing on the dielectric withstand behavior of the OPP film, the withstand voltage being decreased with an increase in each of these contents. In this regard, it is preferable that the chlorine content does not exceed 10 ppm by weight and the ash content does not exceed 30 ppm by weight.

When the content of an antioxidant in the polypropylene resin composition is lower than 500 ppm by weight, thermal degradation may eventually be caused in the composition during shaping by heating into a film while, when the content of the antioxidant is too high, the OPP film may have an increased dielectric tangent as a trend. An oil-impregnated film capacitor prepared by using an OPP film having undergone substantial extent of thermal oxidation in the course of shaping into a film or containing an unduly large amount of an antioxidant is liable to a large internal heat evolution resulting in further progress of thermal degradation or an increased deformation by swelling with an oil thereby incurring an adverse influence on the durability of the capacitor.

The above-mentioned requirements for various property parameters including the melt-flow index, isotacticity, chlorine content, content of an antioxidant and others are not unique but known in the industry of resin film production so that a polypropylene resin having such properties is available on the market by selecting from the commercial products sold as specified for capacitor films.

The OPP film used in the inventive all-film capacitor for microwave ovens is manufactured from the above-described polypropylene resin. It is essential that the OPP film thus manufactured has a hazy value in the range from 5 to 50% or, preferably, from 20 to 40%. The hazy value of a resin film here implied is a value corresponding to the ratio of light scattering by the resin film which is given in percentage by the ratio of the transmitted light intensity to the incident light intensity. The hazy value thus given is an integration of the internal haze occurring within the body of the resin film and the external haze due to scattering of the light on the surface. The hazy value defined in the present invention is the value specified for the external haze.

Namely, the hazy value represents the roughness condition of the film surface or fineness of the surface texture. When the hazy value of an OPP film is less than 5%, the fine structure formed on the surface is not well developed so that the space factor cannot be high enough to reach the desirable range so that the capacitors prepared by using such a film cannot be free from the problem of reliability. When the hazy value is larger than 50%, microscopically complex deep cavities exist on the film surface so that the withstand voltage of the film is so low at the bottoms of these cavities leading to dielectric breakdown of the capacitor.

On the other hand, the space factor here implied is the proportion of the thickness corresponding to the protrusions and cavities making the ruggedness of the film surface, i.e. the absolute value of the surface roughness, to the overall thickness of the resin film. Thus, the space factor, referred to as SF hereinbelow, is given by the equation of SF (%)=[(t−w)/w]×100, in which t is the thickness of the film as determined by a micrometer and the like and w is a film thickness calculated from the weight and true density of the film. The value of the space factor is correlated to the void ratio or the volume of void spaces to be filled with the capacitor oil in the rolled body formed by enrolling alternate layers of the OPP film and the aluminum foil. For example, a larger space factor value means a greater roughness of the film surface.

The OPP films used in the present invention should desirably have a space factor in the range from 5 to 12%. When an OPP film having a space factor value smaller than 5% is used in the preparation of a rolled body by alternate enrolling of the OPP film and an aluminum foil, a drawback is sometimes encountered in the impregnation of the rolled body with a capacitor oil because the oil cannot fully spread throughout the entire void spaces between two of the resin films or between a resin film and an aluminum foil resulting in a decrease in the corona discharge voltage to lead to dielectric breakdown of the resin film and breakdown of the capacitor. When the space factor of the OPP film is greater than 12%, similarly to the case with the hazy value exceeding 50%, the occurrence frequency of deep cavities on the film surface is locally increased resulting in a decrease in the with-stand voltage of the capacitor.

While the surface morphology of an OPP film is varied depending on the film-shaping method and conditions in the shaping method, the film-shaping methods can be grossly classified into the inflation method or the simultaneous biaxial stretching method and the tenter method or the consecutive biaxial stretching method.

The hazy film prepared by the inflation method is initially obtained in a tubular form as the consequence of the method; the surface ruggedness of the film is greater on the slowly cooled side than on the rapidly cooled side resulting in different degrees of the hazy value and the SF value between the outer and inner surfaces of the tubular form.

The tenter method, on the other hand, is a method to produce a resin film in an inherently flat form but is not inapplicable to the production of a hazy film if a measure is undertaken to accomplish different cooling rates between surfaces of the film as formed. In short, the OPP film used in the present invention is not limitative relative to the film-forming method provided that the aforementioned requirements for the various properties of the film are satisfied.

The OPP film used in the present invention should have a thickness in the range from 7 to 30 $\mu$m and the OPP layer of the rolled body can be formed from a single OPP film or from a combination of several OPP films, the number of the films and the thickness of the individual films being varied depending on the intended value of the potential gradient.

Assuming that the withstand voltage required in a capacitor for microwave ovens be 2000 V and the minimum withstand voltage of the film be 300 V/$\mu$m, the dielectric layer should have a thickness of (2000/300=) about 7 $\mu$m or larger or a single plastic film having a thickness of 7 $\mu$m can well form the dielectric layer. It is recommendable, however, to take into account the fact that the actual withstand voltage value of a plastic resin film is sometimes substantially lower than the nominal value due to unevenness in the thickness and occurrence of pinholes depending on the film-forming conditions, intermixing of foreign matter particles, trapping of air and others.

Accordingly, it is important that a film capacitor is designed by assuming a value of the withstand voltage of the dielectric film or potential gradient involving a considerably large safety factor. In this regard, designing of a film capacitor is conducted by assuming the withstand voltage of the film in the range from 40 to 100 V/$\mu$m. A film capacitor designed with an assumed withstand voltage lower than 40 V/$\mu$m of the film suffers a disadvantage of increased costs even though the reliability of the capacitor is increased so much. The problem is vice versa with an assumed withstand voltage of the film higher than 100 V/$\mu$m.

When a film capacitor of 2000 V dielectric breakdown voltage is designed with a film of 80 V/$\mu$m withstand voltage, the breakdown voltage can be accomplished with a single film of (2000/80=) 25 $\mu$m thickness or with a duplicate or triplicate layer of resin films of equal thickness of 12.5 $\mu$m or 8.3 $\mu$m, respectively. Since the safety factor is set to cover the weak points on the film and the probability of coincidence of weak points on different films is increased with the number of the resin films overlaid one on the other, the value of safety factor must be increased with increase in the number of overlaid film sheets. Although the all-film capacitor of the present invention is prepared usually by using a multiplication of OPP films, the number of the multiplicated films should be selected by taking into consideration the working cost because the working efficiency is the highest with a single film.

When the withstand voltage of a dielectric film for designing is assumed to be 40 V/$\mu$m, a 2000 V breakdown voltage of the capacitor can be ensured with an overall film thickness of 50 $\mu$m which is obtained with a duplicate of 25 $\mu$m thick films. When a withstand voltage of the film of 100 V/$\mu$m is assumed in designing of the all-film capacitor, the 2000 V breakdown voltage can be ensured with a single 20 $\mu$m thick film or with a duplicate of 10 $\mu$m thick films with an increase of the safety factor in the latter case.

Besides the hazy value of 5 to 50% and the SF value of 5 to 12%, the OPP film used in the inventive all-film capacitor must be specified in terms of the thermal shrinkage and expansion rates and the ratio of swelling in an oil as important factors. Namely, the film should exhibit 2% or less of thermal shrinkage or expansion after heating at 85° C. for 60 hours. OPP films satisfying these requirements can be obtained by carefully selecting the preparation conditions of the films.

In contrast to the value of above-mentioned thermal shrinkage or expansion which is determined by heating the film in air, the swelling ratio of the film in oil is a practically more important factor having a great influence on the performance of the film capacitor prepared by using the film so that swelling of the film in oil is a phenomenon which cannot be disregarded. As is mentioned before, the swelling of the film in oil is deeply correlated to the crystallinity of the resin forming the film. Also, the swelling ratio in oil is variable depending on the compatibility between the oil and the resin forming the film, which is a polyolefin resin inherently having crystallinity. In the present invention, the OPP film should exhibit a maximum swelling not exceeding 13% or, preferably, not exceeding 10% in the thickness of the film when swelling has come to a stage of levelling off of the film kept in the oil at 85° C. The temperature of the oil in this test is selected at 85° C. because this is the temperature at which the durability test of the capacitor for microwave ovens is undertaken. When swelling of the film at 85° C. exceeds 13%, the film capacitor would fail to pass the durability test. The levelling-off condition of swelling of the film in the oil at 85° C. can be reached by keeping the film in the oil usually for 40 hours or, preferably, for 60 hours.

While, in the rolled body, the distance between the electrodes, that is, between two layers of the aluminum foil is unchanged due to negligibly small stretching and contraction of aluminum foils, the resin films are strongly influenced by heat and oil. When the swelling ratio of the film with oil exceeds 13%, swelling of the film eventually results in bulging deformation or bursting of the metal casing so that the oil spreading in the interstices between layers of the films or between the film and aluminum foil is squeezed out of the interstices adversely affecting the stability of the capacity and withstand voltage of the capacitor due to the decrease of the impregnating oil leading to dielectric breakdown of the capacitor. The oil-immersion time of 40 hours at 85° C. in the oil-swelling test of the resin film is essential because, when the length of oil-immersion time is shorter than 40 hours, the film may have not reached a levelling-off state of swelling so as not to give a reliable indication of swellability.

The all-film capacitor for microwave ovens according to the present invention can be prepared by jointly enrolling an OPP film satisfying the above-described various requirements and an aluminum foil to give a rolled body, which is put into a metal casing and impregnated with a capacitor oil followed by sealing of the casing.

Figure 4:
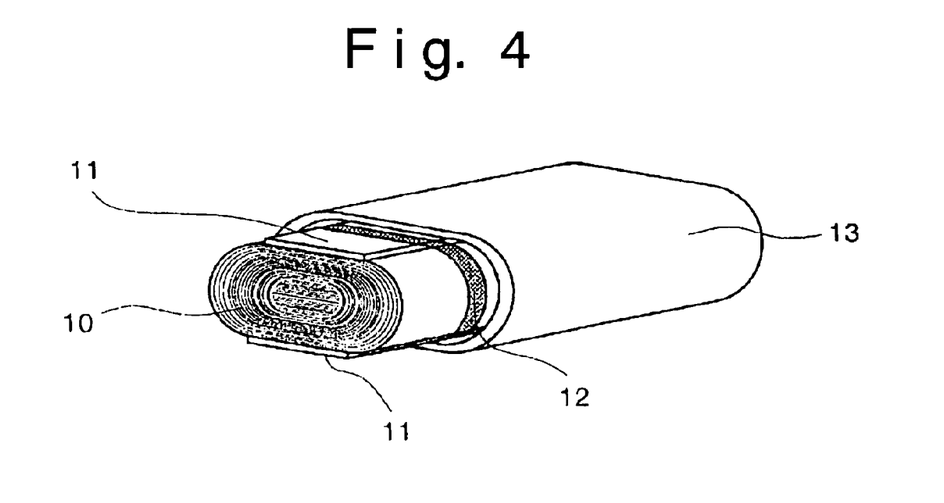
FIG. 4 is a perspective view of the inventive all-film capacitor as flattened and constrained by sandwiching between two rigid plates before encasing in a metal casing.

While the rolled body is obtained first in a cylindrical form by jointly enrolling an OPP film and an aluminum foil on and around a core mandrel, which is then pulled away from the rolled body, the cylindrical body is inserted as a flattened body 10 illustrated in FIG. 4 into a metal casing 13 having a cross section something like a track sports stadium. Such a flattened body 10 can be obtained by pressing the cylindrical rolled body between two parallel plates until the center space left after removal of the core mandrel is collapsed and nearly disappears. Namely, the rolled body 10 applicable to the present invention includes flattened bodies and inductionless flattened bodies. In a cylindrical rolled body keeping the core mandrel unremoved, it is difficult to uniformly impregnate the body with the oil throughout from the lower enrolling layers to the upper enrolling layers. In an unflattened cylindrical rolled body freed from the core mandrel, it is extremely difficult to control the $C_2/C_1$ ratio because of the irregular deformation taking place in the core portion due to the inward force generated by swelling of the film. Commercial products are available on the market of the capacitor-grade aluminum foils suitable for use in the present invention typically having a purity of at least 99% and a thickness of 4 to 7 μm.

The capacitor oil is an indispensable material in order to prevent partial discharge inception between the electrodes. The requirements for the oil include absence of any ionic impurities, small dielectric tangent, excellent absorption for hydrogen gas and large withstand voltage. In particular, the oil used in the present invention should have a dielectric tangent value, tan $\delta_1$, in the range of 0.005 to 0.05% at 80° C. for a frequency of 60 Hz.

It is important to take care of the problem that, even by the use of an oil having as such a dielectric tangent value of 0.01% well satisfying the above requirement, the dielectric tangent value may sometimes be unduly increased by intermixing of impurities in the manufacturing procedure of the capacitor or from the materials in contact with the oil, although aluminum casings are thoroughly cleaned prior to use and the resin films and aluminum foils have no problems with regard to the purities. For example, the capping (not shown in FIG. 4) of a casing 13 bearing a sealing material around the oil injection port for prevention of oil leakage, a tab or lead-out electrode sometimes having a paper sheet attached by using an adhesive, the ending portion of the film after completion of winding fixed by using an adhesive tape 12 and the clamping member 11 or swelling-preventing member present particular problems.

It is sometimes the case that the dielectric tangent value of the oil is increased by contamination by as large as ten times or even larger. Accordingly, a criterion for the usability of a contaminant material is given by the dielectric tangent value, tan $\delta_2$, of the oil when the oil is used to impregnate the rolled body to make up a capacitor. As a measure for usability of an oil, the tan $\delta_2$ value of the oil must not exceed 0.20% since the risk of dielectric breakdown of the capacitor is remarkably increased by using an oil not satisfying this requirement.

Besides the requirement for a low dielectric tangent value, it is essential that the oil has an inherently high withstand voltage. In this regard, it is desirable that the oil has a volume resistivity of at least $10^{15}$ ohm·cm at 80° C. if occurrence of any partial discharge should be avoided.

It is also important that no void spaces are formed between layers of the resin film and the aluminum foil. In this regard, it is desirable that the oil has a relatively low viscosity in order to ensure good spreadability of the oil throughout the spaces between layers of the resin film and the aluminum foil. In addition, it is desirable that the oil has a pour point not exceeding −30° C. so that the capacitor impregnated with the oil is workable without freezing of the oil even in winter in a cold district. This requirement, however, is not critical if the capacitor is to be used only in a warm district where the temperature of the working ambience is never decreased below the ice point. If the phenomenon of partial discharge takes place at a point of the capacitor, the film and oil around the point would eventually be decomposed by the discharge energy with evolution of hydrogen gas, which all the more has an effect of promoting partial discharge. In this regard, it is more advantageous to use an oil which can rapidly absorb the hydrogen gas.

As capacitor oils satisfying the above-described various requirements, aromatic synthetic oils have been used for a long period of time including typical commercial products of PXE and SAS-40 (each a product by Shin-Nippon Petrochemical Co.) as synthetic alkylated aromatic compounds. PXE contains phenylxylylethane as the principal constituent and SAS-40 is a mixture of 32% of m-benzyl toluene, 5% of o-benzyl toluene, 22% of p-benzyl toluene and 38% of diphenylethane. With an object to improve the low temperature characteristics of SAS-40, modified products with a part of the diphenylethane replaced with benzyl toluenes and those added with phenylxyylethane are also available. The capacitor oils consisting of these synthetic alkylated aromatic compounds have particularly excellent absorptivity to hydrogen gas and can be used either singly or as a mixture of two kinds or more.

The capacitor oils currently under use for general-purpose capacitors are each an electrically insulating oil meeting the requirements specified in JIS C2320. These oils include mineral oils, alkylbenzenes, polybutenes, alkylnaphthalenes, alkyldiphenylethanes and silicone oils. These oils cannot be used singly in the present invention excepting those inherently satisfying the requirements of the invention, although they can be used as a component of a mixed oil with other appropriate capacitor oils.

Other classes of oils conventionally used as a capacitor oil but not specified in Japanese Industrial Standard (JIS) include vegetable oils and synthetic ester oils exemplified by soybean oil, rapeseed oil, cottonseed oil, castor oil and the like for the former class and long-chain alcohols, phosphoric acid esters, higher esters and the like for the latter class. These oils, however, cannot be used singly in the present invention as the oil in a capacitor for microwave ovens because the rated voltage in microwave ovens is so high as to be 2000 V or higher while the withstand voltage of these oils is generally not high enough.

The all-film capacitor for microwave ovens according to the present invention can be prepared by the steps including: jointly enrolling an OPP film and an aluminum foil to give a cylindrical rolled body; flattening the rolled body; encasing the flattened rolled body into a casing; subjecting the rolled body to a drying treatment; impregnating the rolled body after drying with a capacitor oil; and subjecting the oil-impregnated rolled body to an aging treatment.

During this sequence of steps, substantial changes take place in the dimensions of the OPP film including swelling by the impregnating oil and thermal shrinkage or thermal expansion by the temperature changes in the oil, of which the former, i.e. swelling, has larger influences on the stability of performance of the capacitor so that the performance of the all-film capacitor of the invention can be optimized only by appropriately selecting the OPP film and the oil.

While the swelling ratio of the OPP film in the oil is specified not to exceed 13% or, preferably, not to exceed 10% in thickness after immersing the film in the oil at 85° C. for 60 hours, this requirement can be satisfied only by adequately selecting the conditions of oil-immersion of the film. Namely, the film after oil impregnation is continuedly kept in the oil at the elevated temperature until levelling off of swelling so that the stability and reliability of the capacitor can be further improved.

The time period for aging, which occurs simultaneously as impregnation of the rolled body with the oil, is at least 48 hours or 48 to 60 hours at a temperature of 30 to 60° C. because, when too short, the oil cannot fully spread into microscopic defects of the film so that the capacitor cannot be imparted with reliability.

Assuming that the electrostatic capacities of the inventive all-film capacitor before and after impregnation with the oil are given by $C_1$ and $C_2$, respectively, it is essential that the value of $C_2/C_1$ ratio is in the range from 1.08 to 1.22 or, preferably, from 1.10 to 1.17 with the film constrained not to expaned with the oil. This requirement is a condition to ensure adequate swelling of the film and full spreading of the oil without overs and shorts throughout the interstices between the layers of the film and between the film and the aluminum foil so as to cover any defects in the film. A $C_2/C_1$ value smaller than this range means insufficient spreading of the oil throughout the spaces between layers so that partial discharge may eventually take place during application of a voltage at positions where spreading of the oil is incomplete. The corona by discharging acts to decompose organic matters including the OPP film and the oil with an increase in the temperature and internal pressure of the capacitor resulting in breakdown of the capacitor. A value of the $C_2/C_1$ ratio exceeding the above range, on the other hand, means an excessive amount of the impregnating oil which may be subject to decomposition eventually leading to breakdown of the capacitor when used repeatedly or, especially, when the oil has. a relatively low withstand voltage.

The $C_2/C_1$ ratio constrained in the range from 1.08 to 1.22 can be accomplished by subjecting a flattened rolled body or inductionless rolled body to either one of the following methods (1) to (4) or (5) a combination of these methods.

(1) Toward the end of the enrolling procedure, when a specified length of the aluminum foil has been rolled up, the remaining end portion of the foil is removed by cutting followed by over-enrolling of the rolled body with the polypropylene film only.

(2) The rolled body is wrapped with a film of a PET resin, PP resin and the like having an increased thickness.

(3) The rolled body is sandwiched under an adequate pressure between two parallel regid plates such as plates of a glass phenolic resin, urea resin and the like.

(4) The rolled body is encased in a casing which is constrained from outside against bulging.

The method (1) utilizes the fact that, in the enrolling at the ending portions of the OPP film without intervention of the aluminum foil, diameter increase of the rolled body due to swelling and thermal expansion is exceeded by the inherent bulging-constraining effect toward inside. The over-enrolling is conducted by at least 15 turns or, preferably, by 20 to 30 turns.

In the method (2), the rolled body is wrapped with a film having greater thickness than the films of the rolled body and the winding length thereof is fixed by using an adhesive tape or by using an adhesive. If necessary, this winding of the thick film is conducted by several turns.

In the method (3), as is illustrated in FIG. 4, a flattened rolled body 10 is sandwiched between two rigid plates 11 on the opposite flat surfaces and the rigid plates 11 are fastened to the rolled body 10 with an adhesive tape 12 wound about them before being encased in a metal casing 13. The plate having rigidity is exemplified by a plate of a glass phenolic resin.

In the method (4), swelling and expansion of the rolled body are restricted by constraining expansion and width increase of a casing such as an aluminum can containing the rolled body by putting one or more of steel hoops on and around the casing. Alternatively, a steel splint is attached to the flat surface of the casing containing the rolled body.

Although it is almost impossible to directly estimate the electrostatic capacity of a film capacitor before impregnation with oil, i.e., $C_1$, from the value after impregnation with oil, i.e., $C_2$, an approximate calculation can be made from values of several parameters including the specific dielectric constant, thickness, width and space factor of the dielectric film, length of the aluminum foil, i.e. electrode, and specific dielectric constant of the oil.

In conducting the method of sandwiching the rolled body with rigid plates such as a glass phenolic resin or urea resin or the method of wrapping the rolled body with a thick film of a plastic resin such as polyethyleneterephthalates and polypropylenes, it is important that these materials coming into contact with the rolled body do not release a noxious impurity as a contaminant of the oil. If an ionic impurity having solubility in the oil is contained therein, the phenomenon of dielectric breakdown readily takes place in the oil-impregnated capacitor.

The value of $C_2/C_1$ ratio of a film capacitor can be kept within the target range by continuing to enroll the dielectric films alone over the enrolled body after extraneous aluminum foil is cut off. It is efficient that this film-only winding is done by at least 15 turns or, preferably, by at least 20 turns. When fewer than 15 turns, the effect of clamping can be achieved only a little and the value of $C_2/C_1$ ratio can hardly be maintained within the target range. Besides the methods for constraining a flattened rolled body on the upper and lower parallel surfaces of the flattened body, it is also possible to restrict bulging of the casing from outside of the casing. These constraining methods can be undertaken either singly or in combination.

Figure 1:
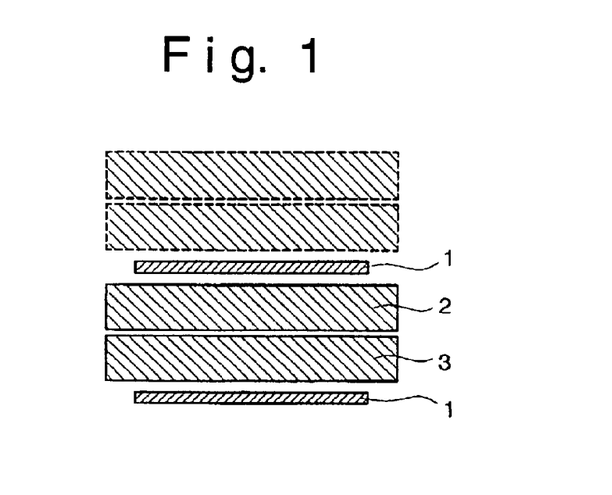
FIG. 1 is a schematic cross sectional illustration of the layered structure of the inventive all-film capacitor.

FIG. 1 is a schematic cross sectional illustration of the layered structure of the rolled body for an oil-impregnated all-film capacitor for microwave ovens, of which the dielectric layers are constituted of OPP films only. The layered structure illustrated in FIG. 1 is constituted of aluminum foils 1,1, a first OPP film 2 and a second OPP film 3 as a unit combination. The rolled body is formed by enrolling these layers in the illustrated order. The dielectric layers between the upper and lower aluminum foils 1,1 as the electrodes are formed from two layers 2,3 of the OPP films. The number of the OPP layers can be adequately selected, as is mentioned before. When several OPP layers are used in combination, it is a basic fashion that the OPP films have one and the same film thickness but optionally can have different thicknesses.

In the oil-impregnated all-film capacitors, the resin films are swollen with the oil to increase the thickness of the respective films so that a compressive force is generated between the layers which have been enrolled at the same time. When the resin films undergo thermal shrinkage, the rolled body is under an increased force toward a tightened condition of enrolling leading to a phenomenon of squeezing out of the oil from between the layers or occurrence of creases in the resin films and aluminum foils and to an increased risk of breakdown of the capacitor.

The manufacturing procedures for mix-type capacitors and all-film capacitors are similar each to the other: including the steps of cleaning of the casing and the capping thereof, enrolling of the layers of dielectric sheets and aluminum foil jointly on a core mandrel with insertion of tabs during enrolling to provide leadouts of electrodes, flattening of the rolled body, assembling by soldering lead wires coming out of the tabs to the capping of the casing provided with external electrodes and a discharge resistor, putting the assembly into the casing, constraining of the casing by winding a band over the junction part between the capping and upper part of the casing to effect closing of the casing, measuring the $C_1$ and tan $\delta_1$ values, drying in vacuum, impregnation with the oil under vacuum, aging, sealing of the casing and measuring of the $C_2$ and tan $\delta_2$ values.

While the above-mentioned drying step is carried out for mix-type capacitors usually at a high temperature, e.g., 90–120° C., for a long time, e.g., 72 hours or longer, since the paper as the dielectric sheet has no melting point and is water-absorptive, the same step for all-film capacitors can be carried out at a lower temperature, e.g., 30–60° C., for a shorter time, e.g., 24 hours or shorter, since the plastic resin of the dielectric films has a relatively low softening or melting point at 168–170° C. and is not water-absorptive.

When the drying temperature is lower than 30° C., an unduly long time is taken for complete drying and, when the drying temperature is too high, the dried capacitor assembly before oil impregnation must be by all means cooled down to 60° C. or below for oil impregnation since otherwise the working efficiency of oil impregnation would be decreased due to swelling of the resin films and contraction of the rolled body.

The OPP film must have a width larger than that of the aluminum foil laid on the OPP film in order to ensure an appropriate margin width between the edge lines of the OPP film and the aluminum foil on each side. The margin width MW (see FIG. 2) should preferably be 3 to 10 mm because, when too small, detour discharges may take place between the electrodes on the end surface of the rolled body eventually leading to breakdown of the capacitor while, when too large, the production cost of the capacitors is increased so much corresponding to the increased amount of the OPP film consumption although there is no problem relative to detour discharges. Meanwhile, the margin width implied for an inductionless flattened rolled body, which uses no flag-type tabs 20 (see FIG. 2), is defined to be the margin width on one of the dielectric sheets of which the head end is covered by the other having a protruded end. The width of protrusion elsewhere is not particularly limitative.

The testing procedures for the capacitor products include the heat-cycle test, measurement of the voltage for partial discharge inception or corona discharge voltage, continuous voltage application test and direct-current breakdown voltage test (DC-BDV).

The heat cycle test is undertaken by twice repeating the cycle consisting of an 8 hours stage for holding at room temperature and a 16 hours stage for holding at 80° C. The continuous voltage application test is conducted by applying a voltage of 2625 V which is 1.25 times of the rated voltage, for 500 hours at an ambient temperature of 85° C. The DC-BDV test is undertaken by applying a DC voltage of 9030 V, which is 4.3 times of the rated voltage, at room temperature. The partial discharge inception voltage or corona discharge voltage is determined by using a corona tester (a product by NF Circuit Block Co.) where the capacitor under testing is kept at 85° C. for 24 hours under preliminary application of AC 1650 V followed by cooling of the capacitor down to room temperature for application of an AC voltage continuously increased at a rate of 4000 V per 90 seconds to record the voltage at which partial discharge is started. When two resin films of 16.5 μm thickness are used, the voltage in the preliminary application is obtained as 1650 V=50 V/mm×16.5 μm×2. The capacitor tested is found to be acceptable only when all of the above described items can be cleared without breakdown.

In the following, the present invention is described in more particulars by way of Examples and Comparative Examples, which, however, never limit the scope of the invention in any way.

EXAMPLE 1

[Preparation of Rolled Body]

By using flag-formed tabs, i.e. readout electrodes, made from a tin-plated copper plate, two OPP sheets having a thickness of 16.5 μm and a width of 75 mm and an aluminum foil having a thickness of 6 μm and a width of 60 mm were jointly enrolled to prepare a rolled body having an outer diameter of 40 mm and an inner diameter of 12 mm for a film capacitor of 2100 V withstand voltage and 1 μF capacity. The margin width was 7.5 mm on each side of the aluminum foil. The tabs were positioned at the center by using an adhesive transfer tape with an acrylic adhesive. The OPP film had a hazy value of 30% and a space factor of 10% and exhibited a swelling ratio of 8% in the direction of thickness when heated in an oil (PXE) for 60 hours at 85° C.

Figure 2:
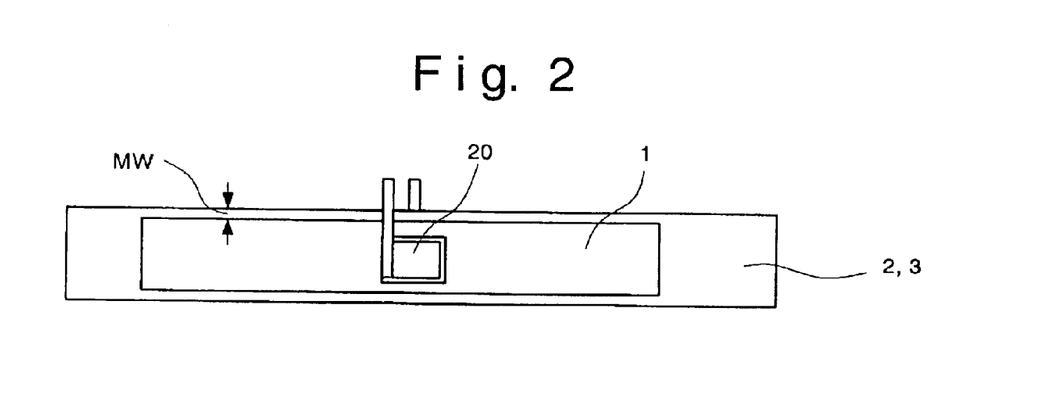
FIG. 2 is a schematic illustration of the layers for a rolled body in Example 1 before enrolling.

FIG. 2 of the accompanying drawing is a plan view of an unrolled layers consisting of an aluminum foil 1, an OPP film 2,3 and a flag-formed tab 20 with a margin width MW on both edge lines of the aluminum foil 1. Enrolling of the layers is started at the left-hand end and completed in the right-hand end.

Figure 3:
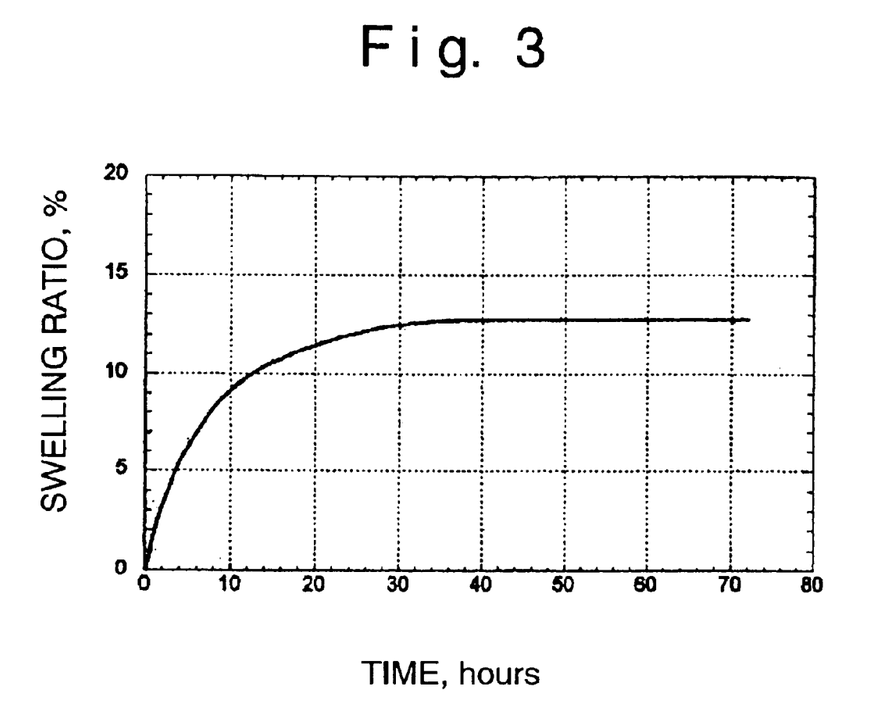
FIG. 3 is a graph showing swelling of the OPP film in Example 1 with time by immersion in a capacitor oil.

FIG. 3 of the accompanying drawing is a graph showing swelling of the OPP film with the impregnation oil PXE by way of the thickness of the OPP film when an OPP film of 35 mm width and 400 mm length was kept immersed for up to over 70 hours in 500 ml of the oil heated at 85° C. in a beaker. This graph indicates that swelling of the OPP film with the oil levels off after about 40 hours of immersion. This result is supportive of the swelling test conditions including 60 hours of immersion which would be sufficient to ensure equilibrium swelling of the OPP film at the temperature.

The above-prepared rolled body was pressed in the direction perpendicular to the axis to give a flattened body, of which the $C_1$ and tan $\delta_1$ values were found 0.936 μF and 0.02%, respectively.

In the next place, two glass phenolic resin plates (Standlite CP-J-8700, a product by Hitachi Chemical Co.) each having a thickness of 2 mm, width of 30 mm and length of 80 mm and freed from any ammoniacal impurities were applied to the upper and lower flat surfaces of the flattened body and fixed thereto for constraining the rolled body by tightly winding with an electrical-grade polyester adhesive tape at such a distance between the plates that the $C_2/C_1$ value would hopefully be 1.14.

The flattened rolled body thus constrained was put into a thoroughly cleaned aluminum casing having a capping, to which a discharge resistor of 10 MΩ resistance was connected at the electrodes. The casing was closed with the capping. Several casings each containing a rolled body as prepared in the above-described way were put together into a hermetically sealable container which was evacuated to a reduced pressure of 0.001 Torr followed by a temperature elevation up to 60° C. to effect drying of the contents for 24 hours and then cooling down to a temperature of 40° C.

The capacitors contained in the casings were impregnated with an oil in the following way. The PXE oil was introduced into the container at 40° C. taking 1 hour in order to ensure full degassing of the oil and the container was kept standing for 50 hours at 40° C. followed by closing of the oil-introduction openings of the casings to complete oil-impregnated capacitors which had the $C_2$ and tan $\delta_2$ values of 1,067 μF and 0.08%, respectively, to give a $C_2/C_1$ ratio of 1.14.

The results of the evaluation tests of the thus prepared all-film capacitors were as shown below and as summarized in Table 1 to follow. These tests were conducted by using testing instruments including an LCR meter, manufactured by NF Circuit Block Co. for the dielectric capacity and tan δ, a corona tester, manufactured by the same company, supra, for partial discharge test, a continuous voltage applicator, manufactured by Soken Denki Co., for the durability test and Thermolabels, manufactured by Nichiyu Giken Kogyo Co., for temperature measurements.

1. Heat-cycle test: All of the test samples passed this test.
2. Partial discharge inception voltage: 2759 V
3. Continuous voltage application test: No dielectric breakdown took place after 500 hours of voltage application.
4. Breakdown test by DC application: The applied DC voltage was increased at a rate of 200 V/second to record a breakdown voltage of 10200 V which was higher than the threshold voltage 9030 V, i.e. 4.3 times of the rated voltage, so that this test could be passed.

EXAMPLE 2 to 7

All-film capacitors were prepared in each of these Examples in the same way as in Example 1 except that the clamping method undertaken was that indicated by (a) to (f) in Table 1, which summarizes the results of the evaluation tests indicating that all of the tested capacitor samples were found acceptable by passing all of the test items. The clamping methods of the rolled body undertaken in these Examples and indicated by (a) to (f) in Table 1 were as follows.

(a) Glass phenolic resin plates were used. See Example 1.
(b) Aluminum plates, each having a thickness of 2 mm, width of 30 mm and length of 80 mm, were used, which were fastened to the rolled body by winding with an insulation-grade polyester adhesive tape.
(c) Fused silica glass plates, each having a thickness of 2 mm, width of 30 mm and length of 80 mm, were used, which were fixed by winding of an insulation-grade polyester adhesive tape.
(d) Clamping was effected by wrapping with a capacitor-grade polyethyleneterephthalate film having a thickness of 20 μm, width of 75 mm and length of 150 mm.
(e) Clamping was effected by wrapping with a capacitor-grade pure polypropylene resin film having a thickness of 25 μm, width of 75 mm and length of 100 mm.
(f) Clamping was effected by enrolling the rear end portion of the OPP films (unaccompanied by aluminum foil) by 30 turns (Example 6) or 20 turns (Example 7) followed by fixing with an insulation-grade polyester adhesive tape.

TABLE 1

| | | Example | | | | | | |
|---|---|---|---|---|---|---|---|---|
| | | 1 | 2 | 3 | 4 | 5 | 6 | 7 |
| OPP | Thickness, μm | 16.5 | 16.5 | 16.5 | 16.5 | 16.5 | 16.5 | 16.5 |
| | Width, mm | 75 | 75 | 75 | 75 | 75 | 75 | 75 |
| | No. of films | 2 | 2 | 2 | 2 | 2 | 2 | 2 |
| | Hazy, % | 30 | 30 | 30 | 30 | 30 | 30 | 30 |
| | SF value, % | 10 | 10 | 10 | 10 | 10 | 10 | 10 |
| | Swelling ratio, % | 8 | 8 | 8 | 8 | 8 | 8 | 8 |
| Al | Thickness, μm | 6 | 6 | 6 | 6 | 6 | 6 | 6 |
| Oil | Grade | PXE | PXE | PXE | PXE | PXE | PXE | PXE |
| | Impregnation at, ° C. | 40 | 40 | 40 | 40 | 40 | 40 | 40 |

TABLE 1-continued

|  |  | Example | | | | | | |
|---|---|---|---|---|---|---|---|---|
|  |  | 1 | 2 | 3 | 4 | 5 | 6 | 7 |
|  | Impregnation for, hours | 60 | 60 | 60 | 60 | 60 | 60 | 60 |
|  | tan $\delta_1$, % | 0.02 | 0.03 | 0.06 | 0.05 | 0.03 | 0.02 | 0.02 |
|  | tan $\delta_2$, % | 0.08 | 0.03 | 0.07 | 0.06 | 0.03 | 0.09 | 0.07 |
| Capacity | $C_1$, μF | 0.936 | 0.89 | 0.88 | 0.91 | 0.92 | 0.90 | 0.891 |
|  | $C_2$, μF | 1.067 | 1.04 | 1.01 | 1.03 | 1.02 | 1.015 | 1.017 |
|  | $C_2/C_1$ | 1.14 | 1.17 | 1.15 | 1.13 | 1.11 | 1.13 | 1.14 |
| Rolled body |  |  |  |  | flattened |  |  |  |
| Margin width, mm |  | 7.5 | 7.5 | 7.5 | 7.5 | 7.5 | 7.5 | 7.5 |
| Clamping |  | (a) | (b) | (c) | (d) | (e) | (f) | (f) |
| Result of testing | heat cycle |  |  |  | test passed |  |  |  |
|  | continuous voltage appln. |  |  |  | test passed |  |  |  |
|  | breakdown voltage |  |  |  | test passed |  |  |  |
|  | breakdown voltage, V | 10,200 | 9,300 | 10,100 | 10,700 | 10,300 | 11,100 | 10,900 |
| Local discharge initiation, V |  | 2,759 | 2,597 | 2,638 | 2,551 | 2,664 | 2,585 | 2,709 |
| Overall evaluation |  |  |  |  | acceptable |  |  |  |

EXAMPLES 8 to 14

All-film capacitors were prepared in each of these Examples in a similar manner to Examples 2 to 7 under the conditions summarized in Table 2 below which also summarizes the results of the evaluation tests indicating that all of the tested capacitor samples were found acceptable. The clamping in Example 13 was conducted by rear end enrolling of the OPP film followed by pressing between glass phenolic resin plates.

Comparative Example 1 The capacitor oil used for impregnation was rapeseed oil instead of the PXE oil.

Comparative Example 2 The film used had an outstandingly small space factor value of 4%.

Comparative Example 3 The film used had an outstandingly large swelling ratio of 15%.

Comparative Example 4 Oil impregnation was carried out at an outstandingly low temperature of 20° C. instead of 40° C.

TABLE 2

|  |  | Example | | | | | | |
|---|---|---|---|---|---|---|---|---|
|  |  | 8 | 9 | 10 | 11 | 12 | 13 | 14 |
| OPP | Thickness, μm | 16.5 | 16.5 | 30 | 16.5 | 16.5 | 8 | 16.5 |
|  | Width, mm | 75 | 75 | 75 | 75 | 75 | 75 | 75 |
|  | No. of films | 2 | 2 | 1 | 2 | 2 | 4 | 2 |
|  | Hazy, % | 40 | 13 | 50 | 30 | 30 | 15 | 30 |
|  | SF value, % | 10 | 5 | 10 | 10 | 10 | 10 | 10 |
|  | Swelling ratio, % | 8 | 8 | 8 | 8 | 8 | 8 | 8 |
| Al | Thickness, μm | 6 | 6 | 6 | 6 | 6 | 6 | 6 |
| Oil | Grade | PXE | PXE | PXE | SAS40 | SAS40 | PXE | PXE |
|  | Impregnation at, ° C. | 40 | 40 | 40 | 40 | 40 | 40 | 40 |
|  | Impregnation for, hours | 60 | 60 | 60 | 60 | 60 | 60 | 60 |
|  | tan $\delta_1$, % | 0.02 | 0.02 | 0.04 | 0.04 | 0.05 | 0.05 | 0.02 |
|  | tan $\delta_2$, % | 0.08 | 0.06 | 0.04 | 0.08 | 0.07 | 0.06 | 0.06 |
| Capacity | $C_1$, μF | 0.91 | 0.91 | 0.89 | 0.92 | 0.90 | 0.91 | 0.892 |
|  | $C_2$, μF | 1.03 | 1.02 | 1.03 | 1.03 | 1.03 | 1.04 | 1.014 |
|  | $C_2/C_1$ | 1.13 | 1.12 | 1.16 | 1.12 | 1.14 | 1.14 | 1.14 |
| Rolled body |  |  |  |  | flattened |  |  |  |
| Margin width, mm |  | 5.5 | 5.5 | 5.5 | 7.5 | 7.5 | 7.5 | 7.5 |
| Clamping |  | (f) | (f) | (f) | (f) | (f) | (f) + (a) | (f) |
| Result of testing | heat cycle |  |  |  | test passed |  |  |  |
|  | continuous voltage appln. |  |  |  | test passed |  |  |  |
|  | breakdown voltage |  |  |  | test passed |  |  |  |
|  | breakdown voltage, V | 10,700 | 10,100 | 9,600 | 10,500 | 10,800 | 10,400 | 9,900 |
| Local discharge initiation, V |  | 2,622 | 2,551 | 2,703 | 2,549 | 2,497 | 2,522 | 2,538 |
| Overall evaluation |  |  |  |  | acceptable |  |  |  |

COMPARATIVE EXAMPLES 1 to 7

All-film capacitors were prepared in each of these Comparative Examples in a similar manner to Examples 2 to 7 excepting for the changes shown in Table 3 and described below.

Comparative Example 5 Oil impregnation was carried out at a high temperature of 80° C. instead of 40° C. taking a shorter time of 8 hours instead of 60 hours.

Comparative Example 6 The value of $C_2/C_1$ ratio was 1.25, higher than the upper threshold.

Comparative Example 7 The rolled body was encased without clamping.

TABLE 3

|  |  | Comparative Example | | | | | | |
|---|---|---|---|---|---|---|---|---|
|  |  | 1 | 2 | 3 | 4 | 5 | 6 | 7 |
| OPP | Thickness, $\mu$m | 16.5 | 16.2 | 16.5 | 16.5 | 16.5 | 16.5 | 16.5 |
|  | Width, mm | 75 | 75 | 75 | 75 | 75 | 75 | 75 |
|  | No. of films | 2 | 2 | 2 | 2 | 2 | 2 | 2 |
|  | Hazy, % | 30 | 5 | 30 | 30 | 30 | 30 | 30 |
|  | SF value, % | 10 | 4 | 4 | 10 | 10 | 10 | 10 |
|  | Swelling ratio, % | 8 | 8 | 15 | 8 | 8 | 8 | 8 |
| Al | Thickness, $\mu$m | 6 | 6 | 6 | 6 | 6 | 6 | 6 |
| Oil | Grade | rapeseed oil | PXE | PXE | PXE | PXE | PXE | PXE |
|  | Impregnation at, °C. | 40 | 40 | 40 | 20 | 80 | 40 | 40 |
|  | Impregnation for, hours | 60 | 60 | 60 | 60 | 8 | 60 | 60 |
|  | tan $\delta_1$, % | 0.02 | 0.02 | 0.04 | 0.02 | 0.05 | 0.05 | 0.04 |
|  | tan $\delta_2$, % | 0.09 | 0.09 | 0.06 | 0.02 | 0.07 | 0.07 | 0.07 |
| Capacity | $C_1$, $\mu$F | 0.89 | 0.91 | 0.91 | 0.899 | 0.92 | 0.89 | 0.91 |
|  | $C_2$, $\mu$F | 1.01 | 1.02 | 1.04 | 1.011 | 1.03 | 1.11 | 1.06 |
|  | $C_2/C_1$ | 1.13 | 1.12 | 1.14 | 1.12 | 1.12 | 1.25 | 1.16 |
| Rolled body |  |  |  |  | flattened |  |  |  |
| Margin width, mm |  | 5.5 | 5.5 | 5.5 | 5.5 | 5.5 | 5.5 | 5.5 |
| Clamping |  | (a) | (g) | (g) | (f) | (f) | (f) | none |
| Result of testing | heat cycle |  |  |  | test passed |  |  |  |
|  | continuous voltage appln. |  |  |  | failed |  |  |  |
|  | breakdown voltage |  |  |  | failed |  |  |  |
|  | breakdown voltage, V | — | — | — | — | — | — | — |
| Local discharge initiation, V |  | 1,603 | 1,838 | 1,277 | 1,322 | 838 | 1,066 | 849 |
| Overall evaluation |  |  |  |  | unacceptable |  |  |  |

What is claimed is:

1. An all-film oil-impregnated capacitor for use in a microwave oven which comprises a rolled body as a jointly enrolled body of layers of a dielectric sheet material and an aluminum foil around an axis and impregnated with a capacitor oil, and a casing, having a similar contour as said rolled body, in which said rolled body is contained; characterized in that the dielectric sheet material essentially consists of at least one film of a polypropylene resin.

2. The all-film oil-impregnated capacitor for use in a microwave oven as claimed in claim 1, which has a constraining means for constraining said rolled body into a flattened configuration having a track cross-section.

3. The all-film oil-impregnated capacitor for use in a microwave oven as claimed in claim 2 in which the polypropylene resin film has a total thickness in the range from 7 to 30 $\mu$m, a hazy value in the range from 5 to 50% and a space factor in the range from 5 to 12% and exhibits a changing ratio of thickness in the range not exceeding 13% when the film is kept immersed in a capacitor oil at 85° C. for at least 40 hours and the aluminum foil has a thickness in the range from 4 to 7 $\mu$m, and the dielectric tangent value (tan $\delta$) of the capacitor oil after immersion does not exceed 0.20% as determined at a temperature of 80° C. and a frequency of 60 Hz.

4. The all-film oil-impregnated capacitor for use in a microwave oven as claimed in claim 3 in which the layer of the dielectric sheet material consists of two films of the polypropylene resin in combination.

5. The all-film oil-impregnated capacitor for use in a microwave oven as claimed in claim 3 in which the capacitor has a dielectric capacity which is 1.08 to 1.22 times of the dielectric capacity thereof in the absence of the impregnating capacitor oil.

6. The all-film oil-impregnated capacitor for use in a microwave oven as claimed in claim 3 in which said constraining means comprises a number of turns of rear end portion of said film(s), unaccompanied by aluminum foil, clamped onto said rolled body.

7. The all-film oil-impregnated capacitor for use in a microwave oven as claimed in claim 3 in which said constraining means comprises a separate plastic film of a material selected from polyethyleneterephthalates and polypropylenes, clamped onto said rolled body.

8. The all-film oil-impregnated capacitor for use in a microwave oven as claimed in claim 3 in which said constraining means comprises two rigid plates between which said rolled body is sandwiched.

9. The all-film oil-impregnated capacitor for use in a microwave oven as claimed in claim 3 in which said constraining means comprises rigid support body selected from metallic hoops and splints, which prevents deformation of said casing.

10. A method for the preparation of an all-film oil-impregnated capacitor for use in a microwave oven according to claim 1 which comprises the steps of:
(a) using a capacitor oil having a dielectric tangent value in the range from 0.005 to 0.05% as measured before impregnation of the rolled body at a temperature of 80° C. and a frequency of 60 Hz; and
(b) conducting the impregnation of the rolled body with the capacitor oil at a temperature in the range from 30 to 60° C.

* * * * *